United States Patent
Okuda et al.

(10) Patent No.: US 9,782,977 B2
(45) Date of Patent: Oct. 10, 2017

(54) PRINTED MATTER, METHOD FOR RECORDING COLOR IMAGES, COLOR PRINTED MATTER, LOOK-UP TABLE FOR USE IN COLOR IMAGE RECORDING, AND WHITE INK

(71) Applicant: Seiko Epson Corporation, Tokyo (JP)

(72) Inventors: Ippei Okuda, Shiojiri (JP); Takayoshi Kagata, Shiojiri (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 202 days.

(21) Appl. No.: 14/564,919

(22) Filed: Dec. 9, 2014

(65) Prior Publication Data

US 2015/0091972 A1    Apr. 2, 2015

Related U.S. Application Data

(62) Division of application No. 13/013,869, filed on Jan. 26, 2011, now abandoned.

(30) Foreign Application Priority Data

Jan. 27, 2010   (JP) ................................. 2010-015701

(51) Int. Cl.
*B41J 2/21*   (2006.01)
*C09D 11/037*   (2014.01)
*C09D 11/322*   (2014.01)

(52) U.S. Cl.
CPC ............... *B41J 2/21* (2013.01); *B41J 2/2114* (2013.01); *C09D 11/037* (2013.01); *C09D 11/322* (2013.01); *Y10T 428/24802* (2015.01)

(58) Field of Classification Search
CPC ......... B41J 2/21; B41J 2/2114; C09D 11/037; C09D 11/322; Y10T 428/24802
See application file for complete search history.

(56) References Cited

U.S. PATENT DOCUMENTS

| | | | |
|---|---|---|---|
| 4,880,465 A | 11/1989 | Loria et al. | |
| 6,271,285 B1 | 8/2001 | Miyabayashi et al. | |
| 7,168,802 B2 | 1/2007 | Kondo | |
| 7,279,511 B2 * | 10/2007 | Zhu | C09D 11/322 |
| | | | 106/31.6 |
| 2005/0282946 A1 | 12/2005 | Lin et al. | |
| 2008/0152825 A1 | 6/2008 | Mukai et al. | |

FOREIGN PATENT DOCUMENTS

| | | |
|---|---|---|
| JP | 2000-239585 A | 9/2000 |
| JP | 2003-182061 A | 7/2003 |
| JP | 2004-231813 A | 8/2004 |
| JP | 3562754 B2 | 9/2004 |
| JP | 2006-282822 | 10/2006 |

* cited by examiner

*Primary Examiner* — Patrick Niland

(74) *Attorney, Agent, or Firm* — Harness, Dickey & Pierce, P.L.C.

(57) ABSTRACT

Printed matter, in which an image is recorded on a clear film with a white ink containing a white coloring material and at least one urethane resin as a resin fixative and having a degree of white shielding of 50 or more.

6 Claims, 10 Drawing Sheets

FIG. 2

(TABLE 1)

| | (REFERENCE) EXAMPLE COMPARATIVE EXAMPLE 1 | (REFERENCE) EXAMPLE COMPARATIVE EXAMPLE 2 | REFERENCE EXAMPLE 1-1 | REFERENCE EXAMPLE 2-1 | REFERENCE EXAMPLE 3-1 | REFERENCE EXAMPLE 4-1 | REFERENCE EXAMPLE 5 |
|---|---|---|---|---|---|---|---|
| TITANIUM DIOXIDE PARTICLE (SOLID) | — | 10 | 10 | 10 | 10 | 10 | — |
| HOLLOW RESIN PARTICLE (SOLID) | — | — | — | — | — | — | 10 |
| ACRYLIC STYRENE RESIN (SOLID) | — | — | 4 | — | — | — | — |
| POLYURETHANE RESIN A (SOLID) | — | — | — | 4 | — | — | — |
| POLYURETHANE RESIN B (SOLID) | — | — | — | — | 4 | — | — |
| POLYURETHANE RESIN C (SOLID) | — | — | — | — | — | 4 | 4 |
| SURFACTANT | — | 1 | 1 | 1 | 1 | 1 | 1 |
| PROPYLENE GLYCOL | — | 2 | 2 | 2 | 2 | 2 | 2 |
| 1,2-HEXANEDIOL | — | 5 | 5 | 5 | 5 | 5 | 5 |
| 2-PYRROLIDONE | — | 2 | 2 | 2 | 2 | 2 | 2 |
| WATER | REMAINDER | REMAINDER | REMAINDER | REMAINDER | REMAINDER | REMAINDER | REMAINDER |
| L VALUE | — | 70.3 | 76.8 | 74.8 | 75.3 | 74.9 | 78.5 |
| INTEGRATED TRANSMITTANCE | 12136 | 1113.9 | 194.3 | 151.76 | 119.17 | 102.45 | 194.5 |
| LS VALUE | 0 | 4.7 | 60 | 64 | 86 | 96 | 69 |
| DEGREE OF SHIELDING (RATING) | E | D | C | B | A | AA | B |

% BY MASS

ACRYLIC STYRENE RESIN: "JONCRYL 62J" MANUFACTURED BY BASF
POLYURETHANE RESIN A: "D-6300" MANUFACTURED BY DAINICHISEIKA COLOR & CHEMICALS MFG. CO., LTD.
POLYURETHANE RESIN B: "D-6455" MANUFACTURED BY DAINICHISEIKA COLOR & CHEMICALS MFG. CO., LTD.
POLYURETHANE RESIN C: "D-2020" MANUFACTURED BY DAINICHISEIKA COLOR & CHEMICALS MFG. CO., LTD.

FIG. 3

(TABLE 2)

| | REFERENCE EXAMPLE 2-1 | REFERENCE EXAMPLE 2-2 | REFERENCE EXAMPLE 2-3 | REFERENCE EXAMPLE 2-4 |
|---|---|---|---|---|
| TITANIUM DIOXIDE PARTICLE (SOLID) | 10 | 10 | 10 | 10 |
| HOLLOW RESIN PARTICLE (SOLID) | — | — | — | — |
| ACRYLIC STYRENE RESIN (SOLID) | — | — | — | — |
| POLYURETHANE RESIN A (SOLID) | 4 | — | — | — |
| POLYURETHANE RESIN B (SOLID) | — | — | — | — |
| POLYURETHANE RESIN C (SOLID) | — | — | — | — |
| W635 (SOLID) | | 4 | | |
| AQ515 (SOLID) | | | 4 | |
| W605 (SOLID) | | | | 4 |
| SURFACTANT | 1 | 1 | 1 | 1 |
| PROPYLENE GLYCOL | 2 | 2 | 2 | 2 |
| 1,2-HEXANEDIOL | 5 | 5 | 5 | 5 |
| 2-PYRROLIDONE | 2 | 2 | 2 | 2 |
| WATER | REMAINDER | REMAINDER | REMAINDER | REMAINDER |
| L VALUE | 74.8 | 74.6 | 75.9 | 74.2 |
| INTEGRATED TRANSMITTANCE | 151.76 | 117.92 | 151.49 | 143.34 |
| LS VALUE | 64 | 81 | 71 | 64 |
| DEGREE OF SHIELDING (RATING) | B | B | B | B |

% BY MASS

ACRYLIC STYRENE RESIN: "JONCRYL 62J" MANUFACTURED BY BASF
POLYURETHANE RESIN A: "D-6300" MANUFACTURED BY DAINICHISEIKA COLOR & CHEMICALS MFG. CO., LTD.
POLYURETHANE RESIN B: "D-6455" MANUFACTURED BY DAINICHISEIKA COLOR & CHEMICALS MFG. CO., LTD.
POLYURETHANE RESIN C: "D-2020" MANUFACTURED BY DAINICHISEIKA COLOR & CHEMICALS MFG. CO., LTD.

FIG. 4

(TABLE 3)

| | REFERENCE EXAMPLE 3-1 | REFERENCE EXAMPLE 3-2 |
|---|---|---|
| TITANIUM DIOXIDE PARTICLE (SOLID) | 10 | 10 |
| HOLLOW RESIN PARTICLE (SOLID) | — | — |
| ACRYLIC STYRENE RESIN (SOLID) | — | — |
| POLYURETHANE RESIN A (SOLID) | — | — |
| POLYURETHANE RESIN B (SOLID) | 4 | — |
| POLYURETHANE RESIN C (SOLID) | — | — |
| WS6021 (SOLID) | — | 4 |
| SURFACTANT | 1 | 1 |
| PROPYLENE GLYCOL | 2 | 2 |
| 1, 2-HEXANEDIOL | 5 | 5 |
| 2-PYRROLIDONE | 2 | 2 |
| WATER | REMAINDER | REMAINDER |
| L VALUE | 75.3 | 74.7 |
| INTEGRATED TRANSMITTANCE | 119.27 | 113.28 |
| LS VALUE | 86 | 85 |
| DEGREE OF SHIELDING (RATING) | A | A |

% BY MASS

ACRYLIC STYRENE RESIN: "JONCRYL 62J" MANUFACTURED BY BASF
POLYURETHANE RESIN A: "D-6300" MANUFACTURED BY DAINICHISEIKA COLOR & CHEMICALS MFG. CO., LTD.
POLYURETHANE RESIN B: "D-6455" MANUFACTURED BY DAINICHISEIKA COLOR & CHEMICALS MFG. CO., LTD.
POLYURETHANE RESIN C: "D-2020" MANUFACTURED BY DAINICHISEIKA COLOR & CHEMICALS MFG. CO., LTD.

FIG. 5

(TABLE 4)

|  | REFERENCE EXAMPLE 4-1 | REFERENCE EXAMPLE 4-2 | REFERENCE EXAMPLE 4-3 |
|---|---|---|---|
| TITANIUM DIOXIDE PARTICLE (SOLID) | 10 | 10 | 10 |
| HOLLOW RESIN PARTICLE (SOLID) | — | — | — |
| ACRYLIC STYRENE RESIN (SOLID) | — | — | — |
| POLYURETHANE RESIN A (SOLID) | — | — | — |
| POLYURETHANE RESIN B (SOLID) | — | — | — |
| POLYURETHANE RESIN C (SOLID) | 4 | — | — |
| D4200 (SOLID) |  | 4 |  |
| WS5000 (SOLID) |  |  | 4 |
| SURFACTANT | 1 | 1 | 1 |
| PROPYLENE GLYCOL | 2 | 2 | 2 |
| 1, 2-HEXANEDIOL | 5 | 5 | 5 |
| 2-PYRROLIDONE | 2 | 2 | 2 |
| WATER | REMAINDER | REMAINDER | REMAINDER |
| L VALUE | 74.9 | 74.2 | 74.8 |
| INTEGRATED TRANSMITTANCE | 102.45 | 104.19 | 100.88 |
| LS VALUE | 96 | 88 | 97 |
| DEGREE OF SHIELDING (RATING) | AA | AA | AA |

% BY MASS

ACRYLIC STYRENE RESIN: "JONCRYL 62J" MANUFACTURED BY BASF
POLYURETHANE RESIN A: "D-6300" MANUFACTURED BY DAINICHISEIKA COLOR & CHEMICALS MFG. CO., LTD.
POLYURETHANE RESIN B: "D-6455" MANUFACTURED BY DAINICHISEIKA COLOR & CHEMICALS MFG. CO., LTD.
POLYURETHANE RESIN C: "D-2020" MANUFACTURED BY DAINICHISEIKA COLOR & CHEMICALS MFG. CO., LTD.

FIG. 6

(TABLE 5)

|  | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| TITANIUM DIOXIDE PARTICLE (SOLID) | 10 | 10 | 10 | 10 | — | 10 |
| WHITE HOLLOW RESIN PARTICLE (SOLID) | — | — | — | — | — | — |
| RESIN A | 1 | 2 | 2 | 2 | — | 2 |
| RESIN B | 1 | 2 | 2 | — | — | 2 |
| RESIN C | 1 | 2 | 1 | 4 | — | 2 |
| SURFACTANT | 1 | 1 | 1 | 1 | — | 1 |
| PROPYLENE GLYCOL | 2 | 2 | 2 | 2 | — | 2 |
| 1,2-HEXANEDIOL | 5 | 5 | 5 | 5 | — | 5 |
| 2-PYRROLIDONE | 2 | 2 | 2 | 2 | — | 2 |
| L VALUE | 75.9 | 74.9 | 74.6 | 75.7 | — | 74.8 |
| INTEGRATED TRANSMITTANCE | 207 | 136 | 128 | 132 | 16136 | 364 |
| LS VALUE | 53 | 73 | 75 | 81 | 0 | 27 |
| GAMUT VOLUME (DARK BACKGROUND) | 400360 | 421936 | 424320 | 444832 | 560 | 378160 |

RESIN A: "W605" MANUFACTURED BY MITSUI CHEMICALS POLYURETHANE CO., LTD.
RESIN B: "JONCRYL 62J" MANUFACTURED BY BASF
RESIN C: "S120" MANUFACTURED BY MITSUI CHEMICALS, INC.

DIFFERENCE BETWEEN LS = 27 AND LS = 53

SAME AREA BUT DIFFERENT INTEGRATED TRANSMITTANCE

SAME INTEGRATED TRANSMITTANCE BUT DIFFERENT AREA

FIG. 10

|  | L | a | b | [K] | [C] | [M] | [Y] |
|---|---|---|---|---|---|---|---|
| LS=27 | 74.8 | −2.65 | −6.08 | 0.33 | 0.36 | 0.31 | 0.27 |
| LS=53 | 75.9 | −2.09 | −6.17 | 0.31 | 0.33 | 0.29 | 0.25 |
| LS=73 | 74.9 | −2.37 | −6.07 | 0.32 | 0.35 | 0.30 | 0.26 |
| LS=81 | 75.7 | −2.12 | −6.38 | 0.31 | 0.34 | 0.29 | 0.25 |

PRINTED MATTER, METHOD FOR RECORDING COLOR IMAGES, COLOR PRINTED MATTER, LOOK-UP TABLE FOR USE IN COLOR IMAGE RECORDING, AND WHITE INK

CROSS-REFERENCE TO RELATED APPLICATIONS

This is a divisional patent application of U.S. application Ser. No. 13/013,869 filed Jan. 26, 2011, which claims priority to Japanese Patent Application No. 2010-015701 filed Jan. 27, 2010, all of which are incorporated by reference herein in their entireties.

BACKGROUND

1. Technical Field

The present invention relates to white printed matter having a wide color reproduction area, particularly white printed matter having a wide color reproduction area when color printing is performed on white printed matter prepared using a white ink on a transparent substrate (for example, a clear film), for example, made of plastic, a method for recording color images, color printed matter, a look-up table for use in color image recording, and a white ink.

2. Related Art

Ink jet recording methods can record high-resolution images with relatively simple apparatuses and are being rapidly developed in various fields. The ink jet recording methods are used in various applications and employ particular recording media and inks suitable for each application.

White printed matter prepared using a white ink is generally assessed with an indicator L-value (the luminance of reflected light).

White coloring materials (pigments), such as titanium oxide, are used to improve visibility. However, dotted portions of color images have a thick ink layer, which retards the curing of the ink layer by active energy beam irradiation through the white layer. The resulting incomplete curing of the color ink layer can cause color bleeding.

Regarding white ink, there is known an ink jet recording method that can exhibit excellent visibility and tone reproducibility even with transparent recording media or low-brightness recording media. (see JP-A-2003-182061)

JP-A-2003-182061 includes the following description.

In the case that an image is viewed on a recording medium, a white image is formed on the recording medium with an ink jet printer having tone reproduction means using a white ink, and a gray-scaled color normal image is then formed on the white image with color inks.

In the case that an image, is viewed through a recording medium, a gray-sealed color reverse image is formed on the recording medium with color inks, and a white image is then formed on the reverse image with a white ink.

In such a case, in order to achieve excellent color developability and gray scalability of color images, the white ink layer preferably has a transmission density of 0.15 or more and an L-value of 65 or more.

More preferably, the white ink layer has a transmission density of 0.2 or more and an L-value of 70 or more. The white ink layer having a transmission density and an L-value smaller than these lower limits or the absence of the white ink layer results in poor visibility with a low contrast between the recording medium and the color image, particularly an unsatisfactory gray scale in a low-density area, causing image degradation. Although the transmission density and the L-value do not have particular upper limits, the transmission density is 0.5 or less and the L-value is 100 or less from an ink manufacturing standpoint.

As described above, judging from the transmission density of 0.15 or more and an L-value of 65 or more, more preferably a transmission density of 0.2 or more and an L-value of 70 or more, JP-A-2003-182061 specifies both a high transmission density and a high L-value to achieve excellent color developability and gray scalability of color images.

Although white printed matter is generally assessed with an indicator $L^*$ value (the luminance of reflected light), the shielding capability (the degree of shielding) of white, printed matter often varies even when the L-value remains constant. The present inventors found that this variation results from a difference in the type and amount of resin used in the white ink (Japanese Patent Application No. 2009-161350).

On the basis of the fact that the shielding capability of white printed matter often varies even when the $L^*$ value remains constant, this finding provides a new method for determining "the degree of white shielding". The degree of white shielding is a new definition of whiteness of white printed matter and is expressed by an interrelated equation of the "$L^*$ value" and the "integrated transmittance in a visible light region": ($L^*$value$-\alpha$)/integrated transmittance$\times$1000 (hereinafter referred to as a lightness shielding (LS) value).

An example regarding white printed matter based on the new method for determining the degree of white shielding will be described below as a reference embodiment.

The reference embodiment is implemented as described below.

A method for determining the degree of white shielding according to the reference embodiment includes the steps of measuring the $L^*$ value of white printed matter, measuring the integrated transmittance of the white printed matter in a visible light region, and determining the degree of white shielding from the $L^*$ value and the integrated transmittance. Thus, the method can determine the degree of white shielding of white printed matter.

In the reference embodiment the degree of white shielding is rated on a six-point scale of AA, A, B, C, D, and E on the basis of the visibility of light from a fluorescent lamp through printed matter printed on a transparent medium with a white ink.

A method for manufacturing a white ink in the reference embodiment will be described below.

The method includes the steps of determining the type of coloring material, determining a target degree of white shielding, and determining the type of resin fixative in accordance with the target degree of white shielding with reference to a table stored in advance defining the relationship between a resin fixative for the coloring material and the degree of white shielding.

An apparatus for supporting the manufacture of a white ink in the reference embodiment will be described below. The apparatus includes a unit for inputting the type of coloring material to be used, a unit for setting a target degree of white shielding, a table defining the relationship between the type of resin fixative and the degree of white shielding, and a unit for determining the type of resin fixative in accordance with the target degree of white shielding with reference to the table.

1. White Ink Composition
1.1 Coloring Material

Preferably, a white ink composition according to the reference embodiment contains a metallic compound or hollow resin particles as an example of white coloring material.

The metallic compound in the reference embodiment may be any compound containing a metal atom that can be used as pigment. Preferably, the metallic compound is a known white pigment, such as metal oxide, barium sulfate, or calcium carbonate. Examples of the metal oxide include, but are not limited to, titanium dioxide, zinc oxide, silica, alumina, and magnesium oxide. Among these, titanium dioxide and alumina are preferred as the metallic compounds in the reference embodiment.

The amount of the metallic compound preferably ranges from 1.0% to 20.0% by mass, more preferably 5.0% to 10.0% by mass, of the total mass of the white ink composition. The amount of the metallic compound above 20.0% by mass may result in low reliability, for example, because of clogging of an ink jet recording head. The amount of the metallic compound below 1.0% by mass tends to result in an insufficiency of color density, such as the degree of whiteness.

The average particle size (outer diameter) of the metallic compound preferably ranges from 30 to 600 nm, more preferably 200 to 400 nm. The outer diameter larger than 600 nm may result in low dispersion stability, for example, because of the sedimentation of particles or low reliability, for example, because of clogging of an ink jet recording head. The outer diameter smaller than 30 nm tends to result in an insufficiency of color density, such as the degree of whiteness.

The average particle size of the metallic compound can be measured with a particle size distribution analyzer designed on the principle of laser diffraction scattering. The laser diffraction particle size distribution analyzer may be a particle size distribution analyzer designed on the principle of dynamic light scattering (for example, "Microtrac UPA" manufactured by Nikkiso co. Ltd.).

Preferably, the hollow resin particles in the reference embodiment have a cavity within a shell made of a liquid-permeable resin. Thus, the cavity of hollow resin particles in an aqueous ink composition is filled with an aqueous medium. The particles filled with the aqueous medium have substantially the same specific gravity as the aqueous medium on the outside. The hollow resin particles can therefore be stably dispersed in the aqueous ink composition without causing sedimentation. This can improve the storage stability and the ejection stability of the white ink composition.

When a white ink composition containing hollow resin particles is ejected onto a recording medium, such as paper, an aqueous medium within the particles evaporates during a drying process, leaving a cavity. In the particles containing air within, the resin layer and the air layer have different refractive indices and effectively scatter incident light. Thus, the particles assume white. The hollow resin particles may have a colored transparent resin layer and assume a color other than white.

The hollow resin particles used in the reference embodiment are not particularly limited and may be known hollow resin particles. For example, hollow resin particles described in U.S. Pat. Nos. 4,880,465 and 3,562,754 can preferably be used.

The average particle size (outer diameter) of the hollow resin particles preferably ranges from 0.2 to 1.0 μm, more preferably 0.4 to 0.8 μm. The outer diameter larger than 1.0 μm may result in low dispersion stability, for example, because of the sedimentation of particles or low reliability, for example, because of clogging of an ink jet recording head. The outer diameter smaller than 0.2 μm tends to result in an insufficiency of color density, such as the degree of whiteness. The inner diameter of the hollow resin particles preferably ranges from approximately 0.1 to 0.8 μm.

The average particle size of the hollow resin particles can be measured with a particle size distribution analyzer designed on the principle of laser diffraction scattering. The laser diffraction particle size distribution analyzer may be a particle size distribution analyzer designed on the principle of dynamic light scattering (for example, "Microtrac UPA" manufactured by Nikkiso. Co., Ltd.).

The amount (solid content) of the hollow resin particles preferably ranges from 5% to 20% by mass, more preferably 8% to 15% by mass, of the total mass of the white ink composition. The amount (solid content) of the hollow resin particles above 20% by mass may result in low reliability, for example, because of clogging of an ink jet recording head. The amount (solid content) of the hollow resin particles below 5% by mass tends to result in an insufficiency of color density, such as the degree of whiteness.

A method for preparing the hollow resin particles is not particularly limited and may be a known method. For example, a method for preparing the hollow resin particles is an emulsion polymerization method in which a vinyl monomer, a surfactant, a polymerization initiator, and an aqueous dispersion medium are heated while stirring in a nitrogen atmosphere to form hollow resin particle emulsion.

Examples of the vinyl monomer include nonionic monoethylenically unsaturated monomer, such as styrene, vinyltoluene, ethylene, vinyl acetate, vinyl chloride, vinylidene chloride, acrylonitrile, (meth)acrylamide, and (meth)acrylate. Examples of (meth)acrylate include methyl acrylate, methyl methacrylate, ethyl (meth)acrylate, butyl (meth)acrylate, 2-hydroxyethyl methacrylate, 2-ethylhexyl (meth)acrylate, benzyl (meth)acrylate, lauryl (meth)acrylate, oleyl (meth)acrylate, palmityl (meth)acrylate, and stearyl (meth)acrylate.

The vinyl monomer may be a bifunctional vinyl monomer. Examples of the bifunctional vinyl monomer include divinylbenzene, allyl methacrylate, ethylene glycol dimethacrylate, 1,3-butane-diol dimethacrylate, and diethylene glycol dimethacrylate. The monofunctional vinyl monomer and the bifunctional vinyl monomer can be copolymerized to produce highly cross-linked hollow resin particles having not only light scattering characteristics but also heat resistance, solvent resistance, and solvent dispersibility.

The surfactant may be any surfactant that can form a molecular assembly, such as micelle, in water, for example, an anionic surfactant, a nonionic surfactant, a cationic surfactant, or an amphoteric surfactant.

The polymerization initiator may be a known compound soluble in water, for example, hydrogen peroxide or potassium persulfate.

The aqueous dispersion medium may be water or water containing a hydrophilic organic solvent.

1.2 Resin Fixative

Preferably, the white ink composition according to the reference embodiment contains a resin fixative for fixing the coloring material.

The resin fixative may be any transparent resin, for example, acrylic styrene resin, polyurethane resin, acrylic resin, styrene resin, polyethylene resin, or wax. Among these, in order to achieve a higher degree of white, shielding, polyurethane resin, particularly carbonate- or ether-based aliphatic urethane resin, is preferred.

The polyurethane resin in the reference embodiment may be of an emulsion type in which the polyurethane resin is dispersed as particulates in a solvent or a solution type in which the polyurethane resin is dissolved in a solvent. The emulsion type can be classified into a forced emulsification type and a self-emulsification type in accordance with the emulsification method. Although the invention can employ either of the types, the self-emulsification type is preferred. This is because dispersion of the self-emulsification type is superior in film-forming properties and water resistance to the forced emulsification type.

The average particle size of the polyurethane resin of the emulsion type preferably ranges from 50 to 20.0 nm, more preferably 60 to 200 mm. The average particle size of the polyurethane resin within this range can result in uniform dispersion of polyurethane resin particles in the white ink composition.

The amount (solid content) of the polyurethane resin preferably ranges from 0.5% to 10% by weight, more preferably 0.5% to 5% by weight, of the total weight of the ink composition. The amount of the polyurethane resin above 10% by weight may result in poor ink reliability (such as clogging or low ejection stability), thus failing to achieve physical properties (such as viscosity) suitable for ink. The amount of the polyurethane resin below 0.5% by weight results in poor fixing of ink on a recording medium, thus failing to form images having high abrasion resistance.

1.3 Penetrating Organic Solvent

Preferably, the white ink composition according to the reference embodiment contains at least one selected, from alkanediols and glycol ethers. Alkanediols and glycol ethers can improve the wettability of ink to the recording surface of recording media and the penetration ability of ink.

Preferred examples of alkanediols include 1,2-alkanediols having four to eight carbon atoms, such as 1,2-butanediol, 1,2-pentanediol, 1,2-hexanediol, 1,2-heptanediol, and 1,2-octanediol. Among these, 1,2-hexanediol, 1,2-heptanediol, and 1,2-octanediol, which have six to eight carbon atoms, are more preferred because of their particularly high ability to penetrate recording media.

Examples of glycol ethers include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. Among these, use of triethyleneglycol monobutyl ether can achieve excellent recording quality.

The amount of at least one selected from these alkanediols and glycol ethers preferably ranges from 1% to 20% by mass, more preferably 1% to 10% by mass, of the total mass of the white ink composition.

1.4 Surfactant

Preferably, the white ink composition according to the reference embodiment contains an acetylene glycol surfactant or a polysiloxane surfactant. The acetylene glycol surfactant or the polysiloxane surfactant can improve the wettability of ink to the recording surface of recording media and the penetration ability of ink.

Examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. The acetylene glycol surfactant may also be a commercial product, for example, Olfin E1010, STG, or Y (manufactured by Nissin Chemical Industry Co., Ltd.), or Surfynol 104, 82, 465, 485, or TG (manufactured by Air Products and Chemicals Inc.).

The polysiloxane surfactant may be a commercial product, for example, BYK-347 or BYK-348 (manufactured by BYK Japan KK).

The white ink composition according to the reference embodiment may contain another surfactant, such as an anionic surfactant, a nonionic surfactant, or an amphoteric surfactant.

The amount of the surfactant preferably ranges from 0.01% to 5% by mass, more preferably 0.1% to 0.5% by mass, of the total mass of the white ink composition.

1.5 Polyhydric Alcohol

Preferably, the white ink composition according to the reference embodiment contains a polyhydric alcohol. When a white ink composition according to an embodiment of the invention is used in an ink jet recording apparatus, a polyhydric alcohol can retard the drying of the ink and can prevent clogging of an ink jet recording head.

Examples of the polyhydric alcohol include ethylene glycol, diethylene glycol, triethylene glycol, poly (ethylene glycol), poly(propylene glycol), propylene glycol, butylene glycol, 1,2,6-hexanetriol, thioglycol, hexylene glycol, glycerin, trimethylolethane, and trimethylolpropane.

The amount of the polyhydric alcohol preferably ranges from 0.1% to 30% by mass, more preferably 0.5% to 20% by mass, of the total mass of the white ink composition.

1.6 Tertiary Amine

Preferably, the white ink composition according to the reference embodiment contains a tertiary amine. The tertiary amine functions as a pH adjusting agent and can easily adjust the pH of the white ink composition.

The tertiary amine may be triethanolamine. The amount of the tertiary amine preferably ranges from 0.01% to 10% by mass, more preferably 0.1% to 2% by mass, of the total mass of the white ink composition.

1.7 Solvent and Additive Agent

The white ink composition according to the reference embodiment generally contains water as a solvent. Preferably, the water is pure water or ultrapure water, such as ion-exchanged water, ultrafiltered water, reverse osmosis water, or distilled water. In particular, water sterilized, for example, by ultraviolet irradiation or the addition of hydrogen peroxide is preferred because the sterilized water is free from mold or bacteria for a long period of time.

If necessary, the white ink composition according to the reference embodiment may contain an additive agent, for example, a fixative, such as water-soluble rosin, a fungicide or preservative, such as sodium benzoate, an antioxidant or ultraviolet absorber, such as allophanate, a chelating agent, or an oxygen absorbent. These additive agents may be used alone or in combination.

1.8 Preparation Method

The white ink composition according to the reference embodiment can be prepared in the same manner as known pigment inks with a known apparatus, such as a ball mill, a sand mill, an attritor, a basket mill, or a rolling mill. Preferably, coarse particles are removed with a membrane filter or a mesh filter.

The white ink composition according to the reference embodiment can be applied to various recording media to form white images. Examples of the recording media include paper, thick paper, textile products, sheets and films, plastics, glass, and ceramics.

The white ink composition according to the reference embodiment may be used in any application, including various ink jet recording methods. Examples of the ink jet recording methods include thermal ink jet, piezoelectric ink jet, continuous ink jet, roller application, and spray application.

Basic operations of a method for determining the degree of white shielding of white printed matter according to the reference embodiment will be described below with reference to a flow chart illustrated in FIG. 1.

Step S1: Measure the L* value of white printed matter printed with a white ink.

Step S2: Determine the integrated transmittance of the white printed matter in a visible light region.

Step S3: Determine the degree of white shielding from the L* value and the integrated transmittance determined in the steps S1 and S2.

The L* value was measured with a commercial colorimeter, such as GretagMacbeth Spectroscan and Spectrolino (manufactured by X-Rite Inc.), on the black backing material.

In white printing, a violet chamber of a special cartridge of an ink jet printer ("PX-G930" manufactured by Seiko Epson Co.) was filled with the white ink composition. A printing test was performed with the printer on which the ink cartridge was mounted.

The white ink composition was applied to Lumirror S10-100 μm (manufactured by Toray Industries, Inc.) in 1440×720 dpi resolution.

In the reference embodiment, the term "duty" is defined by the following equation.

$$\text{Duty (\%)} = \text{Number of dots printed}/(\text{Vertical resolution} \times \text{Horizontal resolution}) \times 100$$

wherein the "number of dots printed" refers to the number of dots printed per unit area, and the "vertical resolution" and the "horizontal resolution" refer to resolution per unit area. 100% duty means the maximum ink mass of a single color per pixel.

The integrated transmittance of a white printed matter sample is the integrated transmittance in a visible light region (for example, a region in the range of 380 to 700 nm). The wavelength range is not limited to the above-mentioned range and may be another wavelength range in the visible light region. In that case, a correspondence between the LS value and the reference level may be different from the correspondence in the reference embodiment.

The integrated transmittance in the reference embodiment is determined in the following manner.

Light passing through a white printed matter sample is measured with a spectrophotometer in the visible light region (the region in the range of 380 to 700 nm) at 1 nm intervals.

The measured values are outputted in the form of 0 to 100(%).

The measured values are integrated (hereinafter referred to as an integrated transmittance).

The integrated transmittance ranges from 0 to 32,000, wherein 0 indicates complete shielding, and 32,000 indicates complete transmission.

Although the spectrophotometer is used in the measurement described above, the integrated transmittance may be determined from reflectivity obtained by reflective measurement.

The degree of white shielding is determined from the L* value and the integrated transmittance by the following equation.

$$\text{Degree of white shielding(LS value)} = (L^* \text{ value} - \alpha)/\text{Integrated transmittance} \times 1000$$

The subtraction of $\alpha$ from the L* value aims to accentuate the influence of a change in the L* value in the white region. The $\alpha$ is a predetermined value (in the range of 60, to 70) and is preferably, but is not limited to, "65".

In the reference embodiment, the degree of white shielding (LS value) determined in the step S3 is compared with a predetermined value.

More specifically, the degree of white shielding is rated on the plurality of levels (AA, A, B, C, D, and E) in organoleptic evaluation relying on the visual inspection of an observer. The degree of white shielding at each of the levels is correlated with actual measurement.

The following are the criteria for the levels (AA, A, B, C, B, and E).

Degree of white shielding E: Light from a fluorescent lamp through white printed matter can be clearly seen while the white printed matter cannot be recognized.

Degree of white shielding E: Light from a fluorescent lamp through white printed matter can be clearly seen while the white printed matter can also be recognized.

Degree of white shielding D: Light from a fluorescent lamp through white printed matter is seen slightly dimly.

Degree of white shielding B: Light from a fluorescent lamp through white printed matter is seen dimly.

Degree of white shielding A: Light from a fluorescent lamp through white printed matter can scarcely be seen.

Degree of white shielding AA: Light from a fluorescent lamp through white printed matter cannot be seen.

In the reference embodiment, the thresholds for the degree of white shielding (LS value) at the levels (AA, A, B, C, D, and E) are, but are not limited to, the following values. The levels according to the organoleptic evaluation relying on the visual inspection of an observer are also not limited to these six levels.

Degree of white shielding E: Transparent medium (not white printed matter).

Degree of white shielding D: White printed matter having an LS value larger than 0 but smaller than 54.

Degree of white shielding C: White printed matter having an LS value of 54 or more.

Degree of white shielding B: White printed matter having an LS value of 64 or more.

Degree of white shielding A: White printed matter having an LS value of 8.2 or more.

Degree of white shielding AA: White printed matter having an LS value of 87 or more.

A method for manufacturing a white ink composition according to the reference embodiment containing a coloring material and a resin fixative will be described below.

A method for manufacturing a white ink composition according to the reference embodiment employs an apparatus for supporting the manufacture of a white ink that includes a unit for inputting the type of coloring material, a unit for setting the degree of white shielding, a storage for storing a table defining the relationship between the type of resin fixative for the coloring material and the degree of white shielding, and a processor. The method for manufacturing a white ink composition according to the reference embodiment includes a step of determining the type of coloring material, a step of setting a target degree of white shielding, and a step of determining the type of resin fixative in accordance with the target degree of white shielding with reference to the table stored in advance defining the relationship between the resin fixative for the coloring material and the degree of white shielding.

Representative reference examples according to the reference embodiment will be described below.

Table 1 in FIG. 2 shows representative examples, the degree of white shielding (LS value) of each of which is rated level AA, A, B, C, D, or E.

FIG. 2 shows reference examples in which titanium dioxide and hollow resin particles are used as coloring materials (there is a case where no coloring material is used), and an acrylic styrene resin ("Joncryl 62J" manufactured by BASF), a urethane resin A ("D-6300" manufactured by Dainichiseika Color & Chemicals Mfg. Co., Ltd.), a urethane resin B ("D-6455" manufactured by Dainichiseika Color & Chemicals Mfg. Co., Ltd.), and a urethane resin C ("D-2020" manufactured by Dainichiseika Color & Chemicals Mfg. Co., Ltd.) are used as representative resin fixatives (there is a case where no resin fixative is used).

For Comparative Example (Reference Example) 1 in FIG. 2 containing no coloring material and no resin fixative (a PET recording medium alone), the L-value is not available, the integrated transmittance is 12136 (light substantially passes through the recording medium), the LS value is 0, and the degree of shielding is rated E.

Comparative Example (Reference Example) 2 contains 10% by mass of titanium dioxide as a coloring material, no resin fixative, 1% by mass of a surfactant, 2% by mass of propylene glycol, 5% by mass of 1,2-hexanediol, 2% by mass of 2-pyrrolidone, and water as the remainder. Comparative Example (Reference Example) 2 has an L-value of 70.3, an integrated transmittance of 1113.9, an LS value of 4.7, and the degree of shielding rated D. The results of Reference Example 2 show that the white ink containing titanium dioxide as a coloring material and no resin fixative has a much lower degree of shielding than white inks containing a resin fixative.

When a white ink having a high degree of white shielding is desired, the white ink preferably contains titanium dioxide and a resin fixative.

Reference Example 1-1 contains 10% by mass of titanium dioxide particles as a coloring material, 4% by mass of an acrylic styrene resin ("Joncryl 62J" manufactured by BASF) as a resin fixative, 1% by, mass of a surfactant, 2% by mass of propylene glycol, 5% by mass of 1,2-hexanediol, 2% by mass of 2-pyrrolidone, and water as the remainder. Reference Example 1-1 has an L-Value of 76.8, an integrated transmittance of 194.3, an LS value of 60, and the degree of shielding rated C.

Reference Example 2-1 contains 10% by mass of titanium dioxide particles as a coloring material, 4% by mass of a urethane resin A ("D6300" manufactured by Dainichiseika Color & Chemicals Mfg. Co. Ltd.) as a resin fixative, 1% by mass of a surfactant, 2% by mass of propylene glycol, 5% by mass of 1,2-hexanediol, 2% by mass of 2-pyrrolidone, and water as the remainder. Reference Example 2-1 has an L-value of 74.8, an integrated transmittance of 151.76, an LS value of 64, and the degree of shielding rated B.

Reference Example 3-1 contains 10% by mass of titanium dioxide particles as a coloring material, 4% by mass of a urethane resin B ("D6455" manufactured by Dainichiseika Color & Chemicals Mfg. Co., Ltd.) as a resin fixative, 1% by mass of a surfactant, 2% by mass of propylene glycol, 5% by mass of 1,2-hexanediol, 2% by mass of 2-pyrrolidone, and water as the remainder. Reference Example 3-1 has an L-value of 75.3, an integrated transmittance of 119.17, an LS value of 86, and the degree of shielding rated A.

Reference Example 4-1 contains 10% by mass of titanium dioxide as a coloring material, 4% by mass of a urethane resin C ("D2020" manufactured by Dainichiseika Color & Chemicals Mfg. Co., Ltd.) as a resin fixative, 1% by mass of a surfactant, 2% by mass of propylene glycol, 5% by mass of 1,2-hexanediol, 2% by mass of 2-pyrrolidone, and water as the remainder. Reference Example 4-1 has an L-value of 74.9, an integrated transmittance of 102.45, an LS value of 96, and the degree of shielding rated AA.

Reference Example 5 contains 10% by mass of hollow resin particles as a coloring material, 4% by mass of a urethane resin B ("D6455" manufactured by Dainichiseika Color & Chemicals Mfg. Co., Ltd.) as a resin fixative, 1% by mass of a surfactant, 2% by mass of propylene glycol, 5% by mass of 1,2-hexanediol, 2% by mass of 2-pyrrolidone, and water as the remainder. Reference Example 5 has an L-value of 78.5, an integrated transmittance of 194.5, an LS value of 69, and the degree of shielding rated B.

The results in FIG. 2 show that the white ink compositions containing titanium dioxide particles as a coloring material and a urethane resin as a resin fixative generally have a high LS value although the LS value depends on the type of urethane resin.

FIG. 2 also shows that use of hollow resin particles as a coloring material (Reference Example 5) results in a higher L-value but a lower LS value than use of titanium dioxide particles (Reference Example 3-1).

FIGS. 3, 4, and 5 show other reference examples having the same degree of shielding (rating) as some of the reference examples in FIG. 2.

FIG. 3 (Table 2) shows other reference examples having the same degree of shielding (rating) B as Reference Example 2-1 shown in FIG. 2. Except that 4% by mass of W635 (Reference Example 2-2), AQ515 (Reference Example 2-3), or W605 (Reference Example 2-4) is used as a resin fixative, the other conditions are the same as the conditions of Reference Example 2-1.

FIG. 4 (Table 3) shows another reference example having the same degree of shielding (rating) A as Reference Example 3-1 shown in FIG. 2. Except that 4% by mass of WS6021 (Reference Example 3-2) is used as a resin fixative, the other conditions are the same as the conditions of Reference Example 2-1.

FIG. 5 (Table 4) shows other reference examples having the same degree of shielding (rating) AA as Reference Example 4-1 shown in FIG. 2. Except that 4% by mass of D4200 (Reference Example 4-2) or WS5000 (Reference Example 4-3) is used as a resin fixative, the other conditions are the same as the conditions of Reference Example 2-1.

In the reference examples, as shown in FIG. 2, titanium dioxide and hollow resin particles are used as coloring materials (there is a case where no coloring material is used), and the acrylic styrene resin ("Joncryl 62J" manufactured by BASF), the urethane resin A ("D-6300" manufactured by Dainichiseika Color & Chemicals Mfg. Co., Ltd.), the urethane resin B ("D-6455" manufactured by Dainichiseika Color & Chemicals Mfg. Co, Ltd.), and the urethane resin C ("D-2020" manufactured by Dainichiseika Color & Chemicals Mfg. Co., Ltd.) are used as representative resin fixatives (there is a case where no resin fixative is used). Each of the reference examples employs may one type of resin (basically urethane resin) as the resin fixative. Thus, the LS value and the applicability of white ink compositions containing a plurality of resins as resin fixatives have not been examined.

SUMMARY

An advantage of some aspects of the invention is that it provides the determination of the LS value of a white ink containing titanium dioxide or hollow resin particles as a coloring material and a combination of at least one urethane resin and another resin as a resin fixative and, as utilization based on the LS value, provides printed matter having a wide color reproduction area.

Another advantage of some aspects of the invention is that it provides a method for recording color images using printed matter and provides color printed matter, a look-up table for use in color image recording, and a white ink for use in printed matter.

In printed matter according to an aspect of the invention, an image is recorded on a clear film with a white ink containing a white coloring material and at least one urethane resin as a resin fixative and having a degree of white shielding of 50 or more.

In printed matter according to an aspect of the invention, an image is recorded on a clear film with a white ink containing a white coloring material and a combination of at least one urethane resin and a resin other than urethane resin as a resin fixative and having a degree of white shielding of 50 or more.

The resin other than urethane resin may include an acrylic styrene resin.

The resin other than urethane resin may include a polyethylene resin.

The degree of white shielding may be 70 or more.

The degree of white shielding may be expressed by

"$L^*$ value−65)/integrated transmittance×1000".

The integrated transmittance is the integral of transmittance at a wavelength in the range of 380 to 700 nm.

A recording method, including recording a color image with a color ink on the image of the printed matter described above, wherein the color image is recorded with reference to a look-up table that corresponds to a predetermined degree of white shielding or a predetermined white ink.

A look-up table for use in the recording of a color image with a color ink on the image of the printed matter according to the recording method described above.

A white ink, containing a white coloring material and a combination of at least one urethane resin and a resin other than urethane resin as a resin fixative, wherein the degree of white shielding in recording of an image on a clear film with the white ink is 50 or more.

An advantage of some aspects of the invention is that it provides the determination of the LS value of a white ink containing a white coloring material and a combination of at least one urethane resin and another resin as a resin fixative and, on the basis of the LS value, provides printed matter having a wide color reproduction area.

Another advantage of some aspects of the invention is that it provides a method for recording color images using printed matter and provides color printed matter, a look-up table for use in color image recording, and a white ink for use in printed matter.

BRIEF DESCRIPTION OF THE DRAWINGS

The invention will be described with reference to the accompanying drawings, wherein like numbers reference like elements.

FIG. 2 illustrates Table 1 showing representative examples, the degree of white shielding (LS value) of each of which is rated level AA, A, B, C, D, or E.

FIG. 3 illustrates Table 2 showing other reference examples having the same degree of shielding (rating) B as Reference Example 2-1 shown in FIG. 2.

FIG. 4 illustrates Table 3 showing another reference example having the same degree of shielding (rating) A as Reference Example 3-1 shown in FIG. 2.

FIG. 5 illustrates Table 4 showing other reference examples having the same degree of shielding (rating) AA as Reference Example 4-1 shown in FIG. 2.

FIG. 6 illustrates Table 5 showing the gamut volumes of Examples 1 to 4 having a degree of white shielding (LS value) of 50 or more and Comparative Examples 1 and 2 having a degree of white shielding (LS value) of less than 50.

FIG. 10 is a table showing the LS value (the degree of white shielding), corresponding a- and b-values, and ODs for black (K), cyan (C), magenta (M), and yellow (Y).

DESCRIPTION OF EXEMPLARY EMBODIMENTS

Examples

Figure 1:
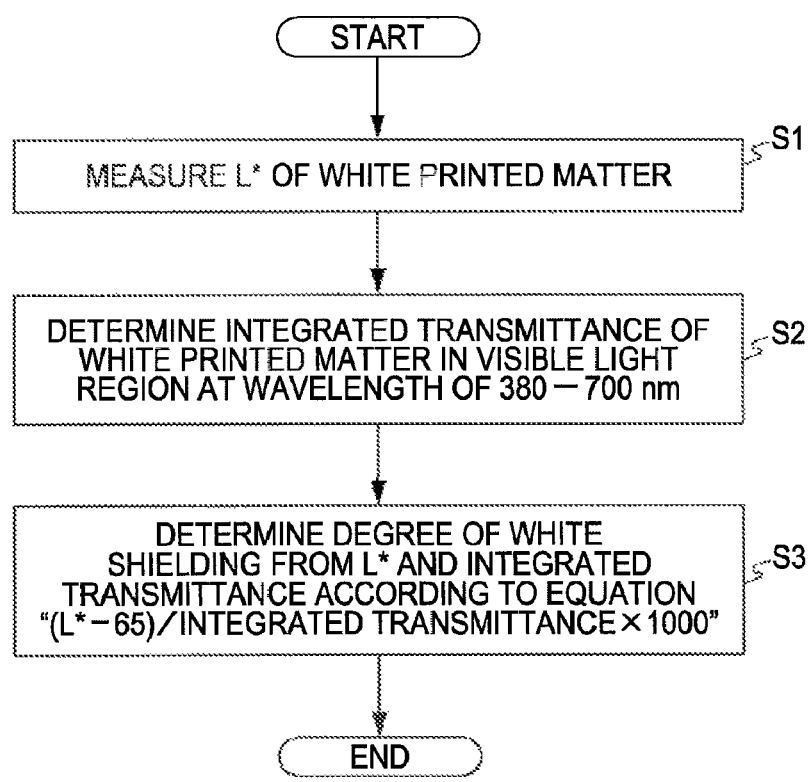
FIG. 1 is a flow chart illustrating basic operations of a method for determining the degree of white shielding of printed matter according to a reference embodiment.

As described below, measurement conditions for examples of the invention shown in Table 5 in FIG. 6 are the same as the measurement conditions for the reference embodiment. The L value was measured with a commercial colorimeter, such as GretagMacbeth Spectroscan and Spectrolino (manufactured by X-Rite Inc.), on the black backing material.

In white printing, a violet chamber of a special cartridge of an ink jet printer ("PX-G930" manufactured by Seiko Epson Co.) was filled with the white ink composition. A printing test was performed with the printer on which the ink cartridge was mounted.

The white ink composition was applied to Lumirror S10-100 μm (manufactured by Toray Industries, Inc.) in 1440×720 dpi resolution.

The integrated transmittance of a white printed matter sample is the integrated transmittance in a visible light region (for example, a region in the range of 380 to 700 nm). The wavelength range is not limited to the above-mentioned range and may be another wavelength range in the visible light region. In that case, a correspondence between the LS value and the reference level may be different from the correspondence in the reference embodiment.

As in the reference embodiment, the integrated transmittance was determined by the following method.

Light passing through a white printed matter sample was measured with a spectrophotometer in the visible light region (the region in the range of 380 to 700 nm) at 1 nm intervals. The measured values were outputted in the form of 0 to 100(%).

The measured values were integrated (hereinafter referred to as an integrated transmittance).

The integrated transmittance ranges from 0 to 32,000, wherein 0 in complete shielding, and 32,000 indicates complete transmission.

Although the spectrophotometer was used in the measurement described above, the integrated transmittance may be determined from reflectivity obtained by reflective measurement.

The degree of white shielding was determined from the L* value and the integrated transmittance by the following equation.

Degree of white shielding(LS value)=(L* value−α)/ integrated transmittance×1000

The subtraction of α from the L* value aimed to accentuate the influence of a change in the L* value in the white region. The α is a predetermined value (in the range of 60 to 70) and was "65" in the examples.

The "Gamut volume" in Table 5 in FIG. 6 refers to the gamut volume in the Lab three-dimensional space.

The gamut volume was measured in the following manner.

A specific of pattern composed of 400 patches was printed on the white printed matter sample with color inks. The colors of patches were measured over the entire printed matter to calculate the gamut volume in the L*a*b* three-dimensional space with an arithmetic tool. The gamut volume calculated is dimensionless.

Representative examples (measurement examples) according to embodiments of the invention will be described below. FIG. 6 (Table 5) shows the gamut volumes of Examples 1 to 4 having a degree of white shielding (LS value) of 50 or more and Comparative Examples 1 and 2 having a degree of white shielding (LS value) of less than 50.

In FIG. 6, titanium dioxide was used as a coloring material (there was a case where no coloring material was used), and a urethane resin (resin A: "W605" manufactured by Mitsui Chemicals Polyurethane Co., Ltd.) and resins other than urethane (resin B: an acrylic styrene resin "Joncryl 62J" manufactured by BASF and resin C: a polyethylene resin "S120" manufactured by Mitsui Chemicals, Inc.) were used as resin fixatives. Furthermore, "WBR-022U" manufactured by Taisei Fine Chemical Co., Ltd., "W635" manufactured by Mitsui Takeda chemicals, Inc., and "D-6300", "D-6455", and "D-2020" manufactured by Dainichiseika Color & Chemicals Mfg. Co., Ltd. can be used as urethane resins. Examples of the resin other than urethane resin include acrylic styrene resins, such as "Joncryl 511", "Joncryl 711", and "Joncryl 7001" manufactured by BASF and polyethylene resins, such as "AQ515" manufactured by BYK Japan KK and "Hytec E-7025P" and "Hytec E-2213" manufactured by Toho Chemical Industry Co., Ltd.

Comparative Example 1 in Table 5 in FIG. 6 containing no coloring material and no resin fixative (a PET recording medium alone) had no available L-value, an integrated transmittance of 16136 (light substantially passed through the recording medium), an LS value of 0, and a gamut volume of 560.

An ink according to Comparative Example 2 contained 10% by mass of titanium dioxide as a coloring material, no urethane resin A, 2% by mass of each of the resin B and the resin C as resin fixatives other than urethane resin, 1% by mass of a surfactant, 2% by mass of propylene glycol, 5% by mass of 1,2-hexanediol, 2% by mass of 2-pyrrolidone, and water as the remainder.

Comparative Example 2 had an L-value of 74.8, an integrated transmittance of 364, an LS value of 27, and a gamut volume of 378160.

An ink according to Example 1 contained 10% by mass of titanium dioxide as a coloring material, 1% by mass of the urethane resin A and 1% by mass of each of the resin B (acrylic styrene resin) and the resin C (polyethylene resin) other than urethane resin as resin fixatives, 1% by mass of surfactant, 2% by mass of propylene glycol, 5% by mass of 1,2-hexanediol, 2% by mass of 2-pyrrolidone, and water as the remainder.

Example 1 had an L-value of 75.9, an integrated transmittance of 207, an LS value of 53, and, a gamut volume of 400360.

An ink according to Example 2 contained 10% by mass of titanium dioxide as a coloring material, 2% by mass of the urethane resin A and 2% by mass, of each of the resin B and the resin C other than urethane resin as resin fixatives, 1% by mass of a surfactant, 2% by mass of propylene glycol, 5% by mass of 1,2-hexanediol, 2% by mass of 2-pyrrolidone, and water as the remainder.

Example 2 had an L-value of 74.9, an integrated transmittance of 136, an LS value of 73, and a gamut volume of 421936.

An ink according to Example 3 contained 10% by mass of titanium dioxide as a coloring material, 2% by mass of the urethane resin A and 2% by mass of the resin B and 1% by mass of the resin C other than urethane resin as resin fixatives, 1% by mass of a surfactant, 2% by mass of propylene glycol, 5% by mass of 1,2-hexanediol, 2% by mass of 2-pyrrolidone, and water as the remainder.

Example 3 had an L-value of 74.6, an integrated transmittance of 128, an LS value of 75, and a gamut volume of 424320.

An ink according to Example 4 contained 10% by mass of titanium dioxide as a coloring material, 2% by mass of the urethane resin A and 4% by mass of the resin C other than urethane resin as resin fixatives, 1% by mass of a surfactant, 2% by mass of propylene glycol, 5% by mass of 1,2-hexanediol, 2% by mass of 2-pyrrolidone, and water as the remainder.

Example 4 had an L-value of 75.7, an integrated transmittance of 132, an LS value of 81, and a gamut volume of 444832.

A gamut difference between Example 1 having an LS value of 53 and Comparative Example 2 having an LS value of 27 will be described below with reference to FIG. 7.

Figure 7:
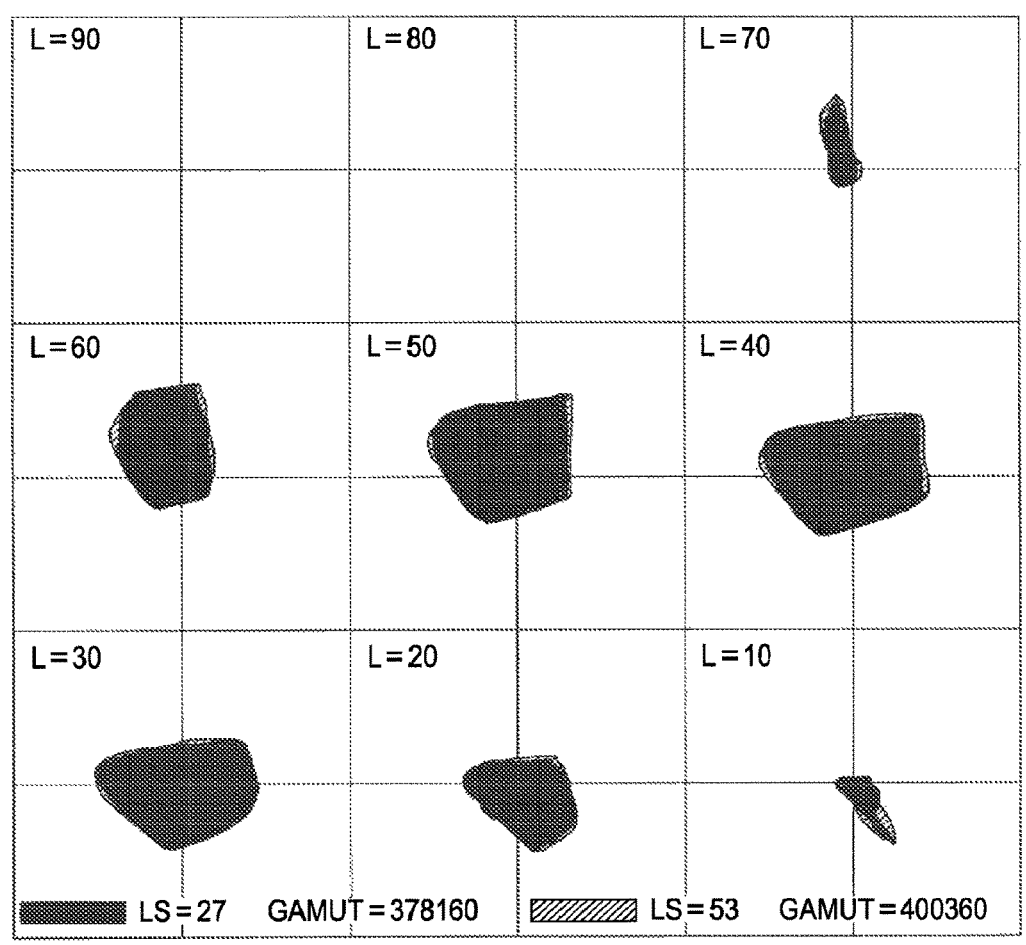
FIG. 7 is an explanatory drawing illustrating a gamut difference between Example 1 having an LS value of 53 and Comparative Example 2 having an LS value of 27.

FIG. 7 illustrates the color reproduction areas in the ab-region partitioned at the L-values of 10, 20, 30, 40, 50, 60, 70, 80, and 90 in the Lab three-dimensional space.

FIG. 7 shows that a white ink having an LS value of 53 has a wider color reproduction area than a white ink having an LS value of 27.

A gamut difference between examples having almost the same L-values (74.9 and 74.8) and different integrated transmittances (136 and 364), that is, between Example having an LS value of 73 and Comparative Example 2 having an LS value of 27 will be described below with reference to FIG. 8.

Figure 8:
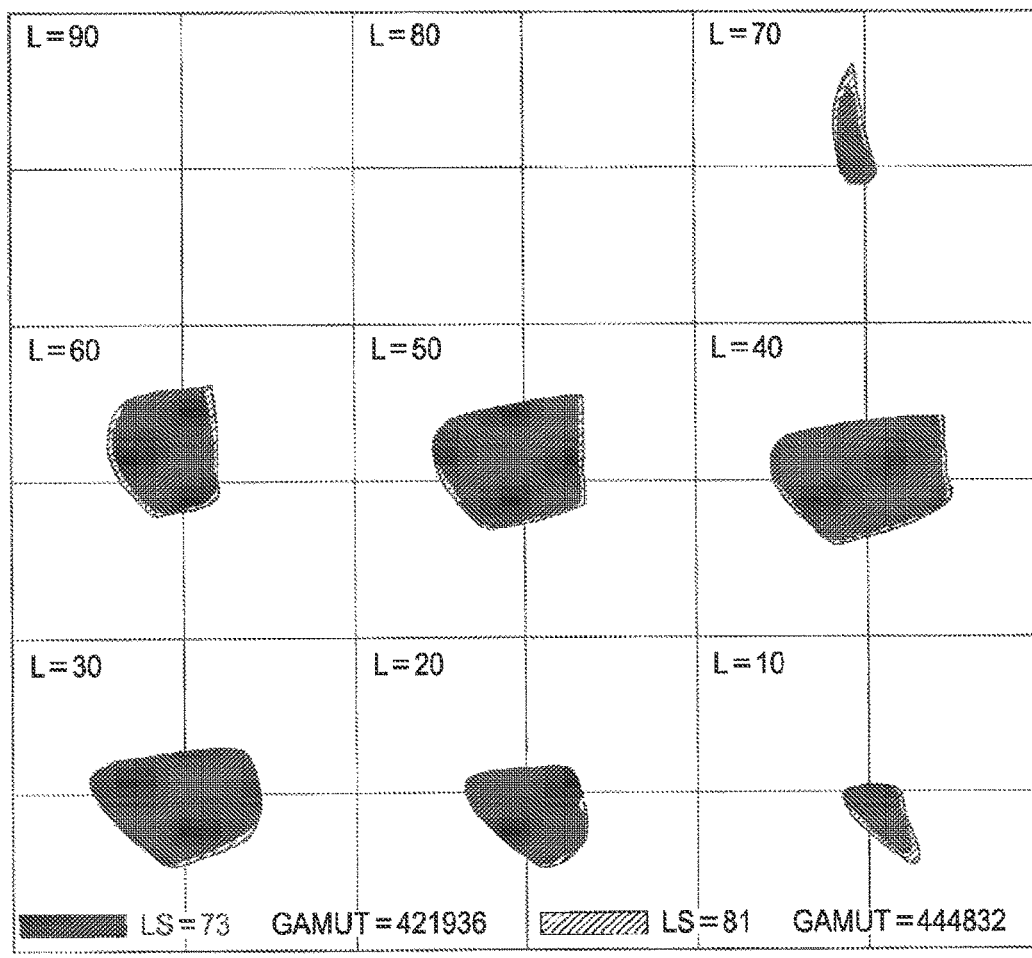
FIG. 8 is an explanatory drawing illustrating a gamut difference between examples having almost the same L-values (74.9 and 74.8) and different integrated transmittances (136 and 364).

FIG. 8 illustrates the color reproduction areas in the ab-region partitioned at the L-values of 10, 20, 30, 40, 50, 60, 70, 80, and 90 in the Lab three-dimensional space for Example 2 having an LS value of 73 and Comparative Example 2 having an LS value of 27.

FIG. 8 shows that a white ink having an LS value of 73 has a wider color reproduction area than a white ink having an LS value of 27.

A gamut difference between examples having almost the same integrated transmittances (136 and 132) and different. L-values (74.9 and 75.7), that is, between Example 2 having an LS value of 73 and Example 4 having an LS value of 81 will be described below with reference to FIG. 9.

Figure 9:
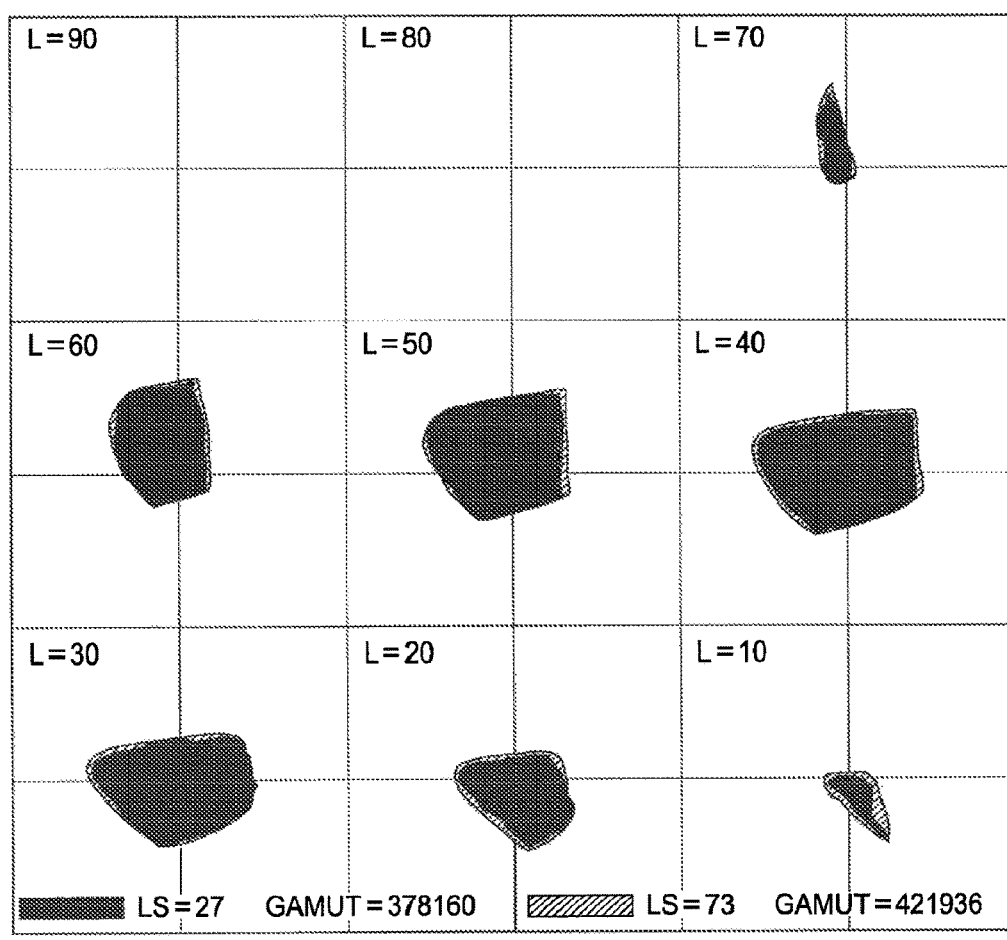
FIG. 9 is an explanatory drawing illustrating a gamut difference between examples having almost the same integrated transmittances (136 and 132) and different L-values (74.9 and 75.7).

FIG. 9 illustrates the color reproduction areas in the ab-region partitioned at the L-values of 10, 20, 30, 40, 50, 60, 70, 80, and 90 in the Lab three-dimensional space for Example 2 having an LS value of 73 and Example 4 having an LS value of 81.

FIG. 9 shows that a white ink having an LS value of 81 has a wider color reproduction area than a white ink having an LS value of 73.

The gamut examples illustrated in FIGS. 7 to 9 show that white printed matter recorded with a white ink having an LS value of 50 or more has a wide color reproduction area.

Furthermore, independent of a difference between the L-values or the integrated transmittances, white printed matter recorded with a white ink having a large LS value has a wide color reproduction area.

A table in FIG. 10 shows the LS value (the degree of white shielding), corresponding a- and b-values, and ODs for black (K), cyan (C), magenta (K), and yellow (Y) for Reference Example 2 and Examples 1, 2, and 4

The table in FIG. 10 shows that the ODs do not vary significantly even when the LS value varies between 27 and 81. The ODs were measured with a commercial colorimeter, such as GretagMacbeth Spectroscan and Spectrolino (manufactured by X-Rite Inc.), on the black backing material.

It white printing, a violet chamber of a special cartridge of an ink jet printer ("PX-G930" manufactured by Seiko Epson Co.) was filled with the white ink composition. A printing test was performed with the printer on which the ink cartridge was mounted.

The white ink composition was applied to Lumirror S10-100 μm (manufactured by Toray Industries, Inc.) in 1440×720 dpi resolution. Patches were then printed with each of color inks (black (K), cyan (C), magenta (M), and yellow (Y)) on the samples to which the white ink composition was applied. The ODs of the patches were measured.

In printing with the color inks in the measurement of the gamut volumes and the ODs described above, black, cyan, magenta, and yellow ink chambers of a special cartridge mounted on an ink jet printer ("PX-G930" manufactured by Seiko Epson Co.) were filled with their respective color inks. Like the white ink composition described above, the color inks used contained water as the main solvent, their respective pigments, a resin fixative, a surfactant, an organic solvent as a penetrant or a humectant, and optionally another additive agent. Such a color ink composition can be found in JP-A-2006-282822.

The examples described above show that the gamut reproducible area in the printing of the color is on a white shielding layer depends on the degree of white shielding. Thus, in the recording of color images on a white base layer having a predetermined degree of white shielding, reference to a look-up table that corresponds to the degree of white shielding allows the reproduction of optimum colors for the degree of white shielding in a wide color reproduction area. The look-up table defines correspondences between image data, such as RBG, to be printed and data on the amount of ink to be applied by a printer. With reference to the look-up table, the printer obtains the data on the amount of ink and performs printing. The data on the amount of ink outputted from the look-up table cover the entire color reproduction area depending on the corresponding degree of white shielding. The data are designed such that the color image recording is performed over the entire color reproduction area depending on the corresponding degree of white shielding.

The examples described above also show that the degree of white shielding varies with the white ink composition (white ink). Thus, in the recording of color images on a white shielding layer printed with a given white ink composition, reference to a look-up table that corresponds to the white ink composition allows the reproduction of optimum colors for the white ink composition in a wide color reproduction area. The data on the amount of ink outputted from the look-up table cover the entire color reproduction area depending on the corresponding white ink. The data are designed such that the color image recording is performed aver the entire color reproduction area depending on the corresponding white ink. Thus, even when the same image data are inputted to look-up tables, the look-up tables in which the corresponding degrees of white shielding or white inks are different can output different data on the amount of ink.

The invention claimed is:

1. A recording method, comprising:
   recording an image on a clear film with a white ink containing a white coloring material and a combination of at least one urethane resin and an acrylic styrene resin as a resin fixative and having a degree of white shielding of 50 or more, an amount of the urethane resin being from 0.5% to 10% by weight of the total weight of the white ink composition, and an amount of the acrylic styrene resin being from 1% to 4% by weight of the total weight of the white ink composition,
   wherein the degree of white shielding is expressed by (L* value−65)/integrated transmittance×1000, with L* being L* in a L*a*b* three-dimensional space instituted by CIE and measured by a colorimeter, and L* is in the range from 0 to 100 not having units,
   light passing through the printed matter is measured with a spectrophotometer in a visible light region having a wavelength in the range of 380 nm to 700 nm at 1 nm intervals,
   measured values of the light passing through the printed matter are outputted in the form of 0% to 100%;
   the measured values are integrated to provide the integrated transmittance at the wavelength in the range of 380 nm to 700 nm; and
   the integrated transmittance ranges from 0 to 32,000, wherein 0 indicates complete shielding and 32,000 indicates complete transmission.

2. The recording method according to claim 1, wherein the at least one urethane resin is a carbonate- or ether-based aliphatic urethane resin.

3. The recording method according to claim 1, wherein the degree of white shielding is 70 or more.

4. The recording method according to claim 1, further comprising recording a color image with a color ink on the image of the clear film, wherein the color image is recorded with reference to a look-up table that corresponds to a predetermined degree of white shielding or a predetermined white ink such that a correct amount of color ink relative to the predetermined degree of white shielding or the predetermined white ink is recorded on the image.

5. The recording method according to claim 1, wherein the step of recording the image on the clear film with the white ink uses ink jet recording.

6. The recording method according to claim 1, wherein the white ink composition contains at least one material selected from the group of alkanediols and glycol ethers, and the at least one material has a content that ranges from 1 to 20% by mass of the total of the ink composition.

* * * * *